July 1, 1930.  W. A. HARNED  1,769,508
TIRE SIGNAL
Filed Aug. 30, 1929.
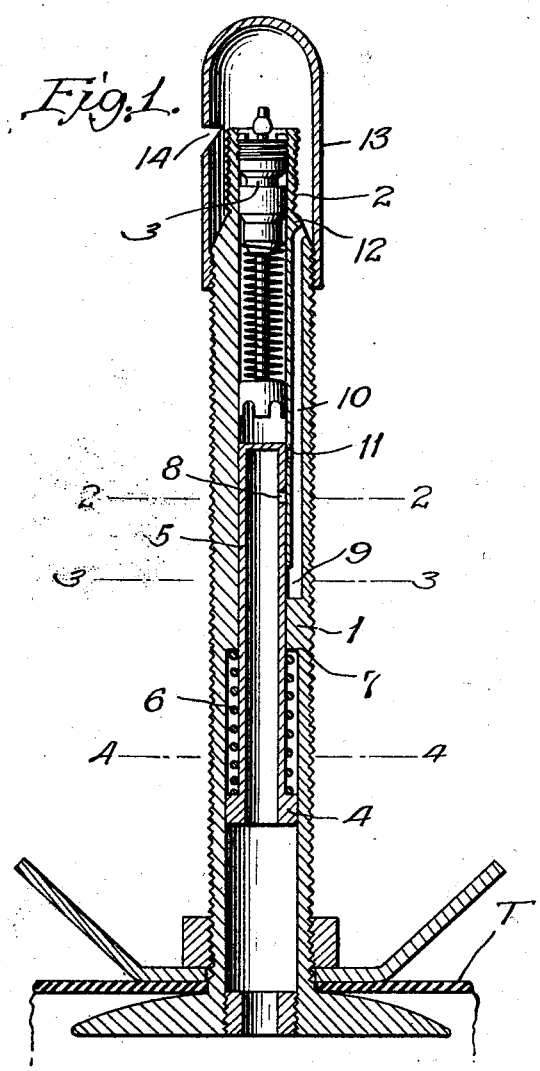
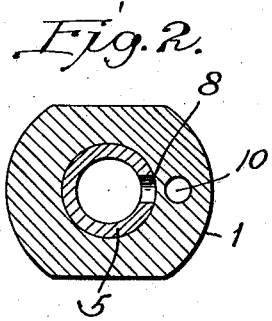
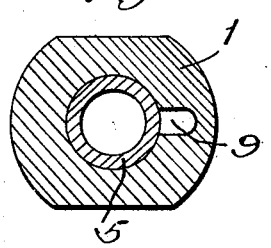
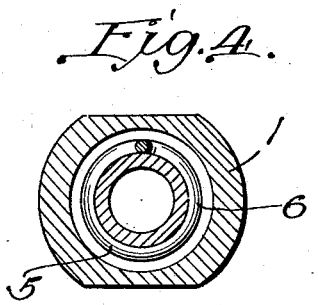
W. A. Harned,
Inventor
By C. A. Snow & Co.
Attorneys.

Patented July 1, 1930

1,769,508

UNITED STATES PATENT OFFICE

WILFORD A. HARNED, OF HELENA, MONTANA

TIRE SIGNAL

Application filed August 30, 1929. Serial No. 389,506.

This invention relates to a signal device for use in connection with the tires of motor vehicles whereby, when the pressure falls below or rises above a predetermined point, the signal will be sounded to give warning to the user.

Another object is to combine a signal of this type with the valve tube of the tire.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a central longitudinal section through the device.

Figure 2 is an enlarged section on line 2—2, Figure 1.

Figure 3 is an enlarged section on line 3—3, Figure 1.

Figure 4 is an enlarged section on line 4—4, Figure 1.

Referring to the figures by characters of reference, 1 designates the exteriorly screw-threaded casing of a tire valve, the free end portion of this casing being reduced and exteriorly screw-threaded as shown at 2 so as to be coupled in the usual way to a tube for supplying air under pressure. In this reduced end portion of the casing is located the usual valve 3 adapted to close under pressure from within the tire tube T.

A piston 4 is mounted in the inner end portion of the casing 1 and has a tubular stem 5 opening therethrough. A spring 6 extends around this stem and bears at one end against the piston 4 and at its other end against an interior shoulder 7 formed in the casing 1. This piston stem 5 has a port 8 adapted to be moved in one direction to register with a port 9 opening into a passage 10 formed in the wall of the casing. The port 8 is adapted to move in the opposite direction to register with a port 11 opening into the passage 10. This passage has its outlet through a shoulder 12 at the base of the reduced portion 2 of the valve casing. A cap 13 is adapted to be placed in engagement with the end of casing 1 and this cap constitutes a whistle, there being a vent 14 through which air, when flowing, will produce a whistling sound.

A tire tube is adapted to be inflated in the usual way, it first being necessary to remove the cap 13. Air forced into the tube will move piston 4 outwardly in casing 1 so that port 8 will be interposed between the two ports 9 and 10 as shown, for example, in Figure 1. Thereafter the cap 13 is placed in position and should the air in the tube fall below a predetermined pressure, the spring 6 will actuate piston 4 so as to slide stem 5 and bring port 8 into communication with port 9. Thus a portion of the air in the tube will escape through these registering ports into passage 10 and thence into the cap 13 from which it will escape with a whistling sound. Should the pressure in the tire increase, as from expansion due to heat, the piston 4 will be pushed outwardly, bringing port 8 into communication with port 11 so that air will escape through these registering ports into the passage 10 and thence to cap 13 from which it will escape with a whistling sound. Thus the device will act as a signal to notify the user should pressure in the tire fall below a predetermined amount or rise above a predetermined amount.

What is claimed is:

1. The combination with the casing of a tire valve and a valve therein adapted to be seated by pressure from within a tire, of a piston in the casing, a tubular stem opening therethrough, yielding means for holding the piston normally in a predetermined position, there being a passage having an outlet at one end and spaced inlets, said piston stem constituting a valve for opening one inlet and closing the second inlet when the pressure from within a tire rises above a predetermined point and for closing the first inlet and opening the second inlet when the pressure in the tire falls below a predetermined point, and a signal device adapted to be sounded by air escaping from the passage when supplied thereto through either inlet.

2. The combination with the casing of a tire valve and a valve therein adapted to be normally closed by pressure from within a tire, there being a passage in the wall of said casing having an outlet at one end and spaced inlets at its other end, of a piston in the casing, a tubular stem opening therethrough having a port, said stem constituting a valve for establishing communication from within the stem with either of the inlets of the passage, yielding means for restraining the movement of the piston and its pin under pressure from within a tire, and a signal device adapted to be sounded by air issuing from the passage.

3. The combination with the casing of a tire valve and a valve therein adapted to be normally closed by pressure from within a tire, said casing having a passage therein provided with an outlet and spaced inlets, of a yieldingly restrained piston in the casing, a tubular stem opening therethrough having a port normally positioned between the inlets, said piston being shiftable by variations of pressure to bring said port into communication with one or the other of the inlets and establishing communication between the passage and the interior of the valve, and a signal device adapted to be sounded by air issuing from the passage.

In testimony that I claim the foregoing as my own, I have hereto affixed my signature.

WILFORD A. HARNED.